Jan. 5, 1965         B. F. ROBINSON ETAL         3,164,410
                     DUMP TRUCK SCRAPER PLATE
Filed July 17, 1963                          3 Sheets-Sheet 1
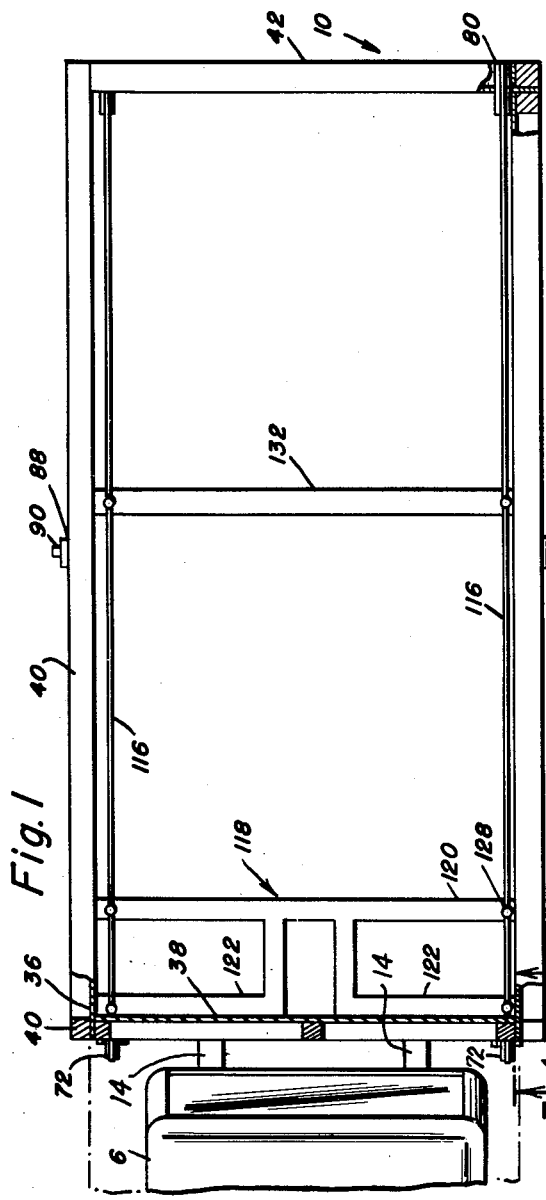
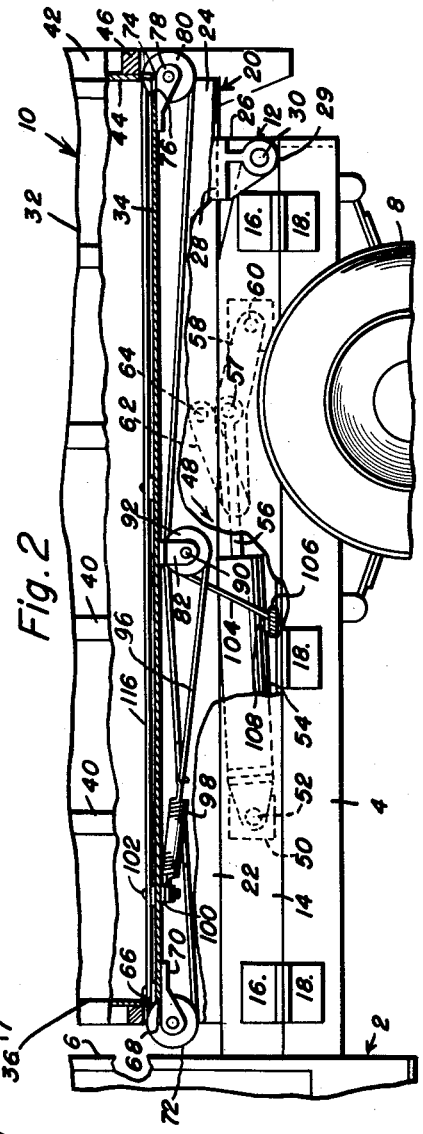
INVENTORS
Benjamin F. Robinson
Bennie F. Robinson, Jr.
BY
ATTORNEYS Jan. 5, 1965   B. F. ROBINSON ETAL   3,164,410
DUMP TRUCK SCRAPER PLATE
Filed July 17, 1963   3 Sheets-Sheet 2
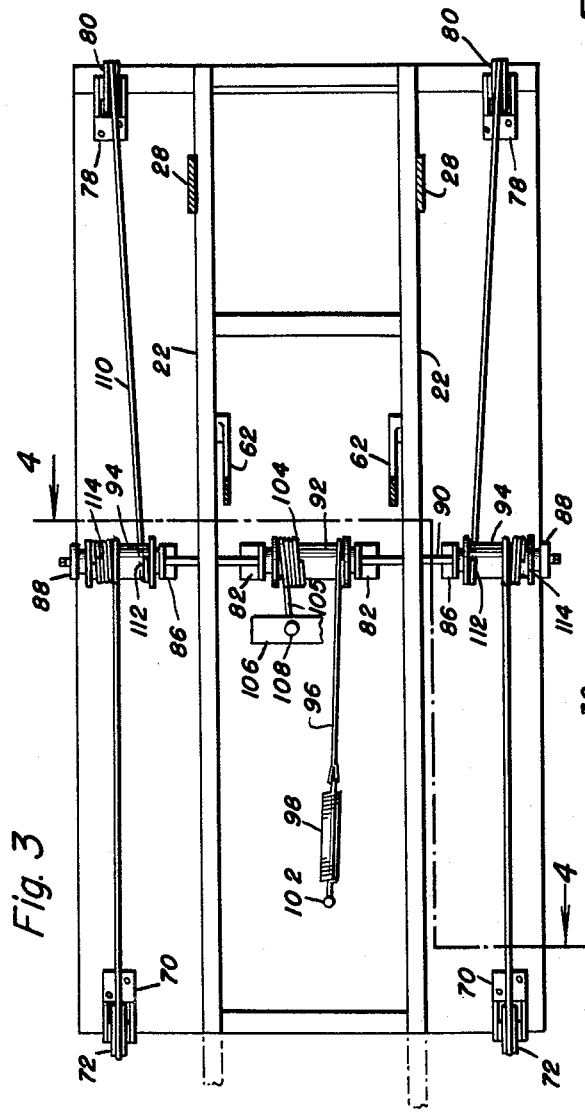
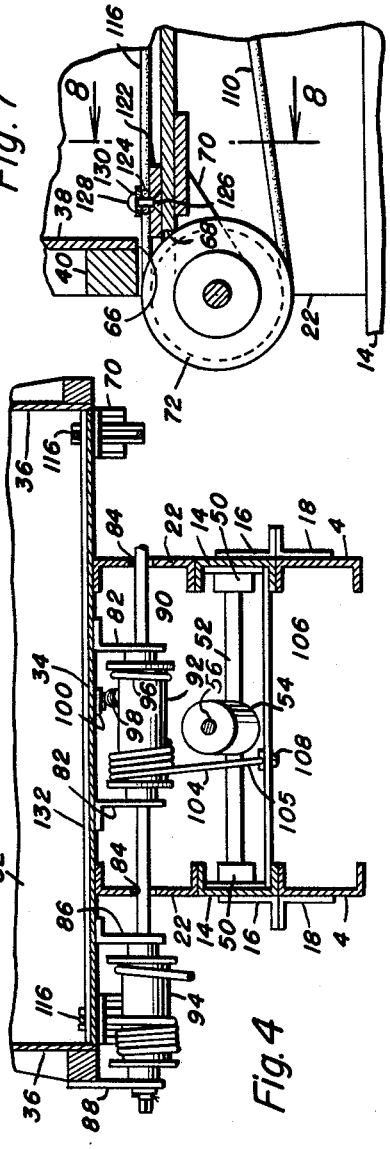
INVENTORS
Benjamin F. Robinson
Bennie F. Robinson, Jr.
BY *Bacon & Thomas*
ATTORNEYS

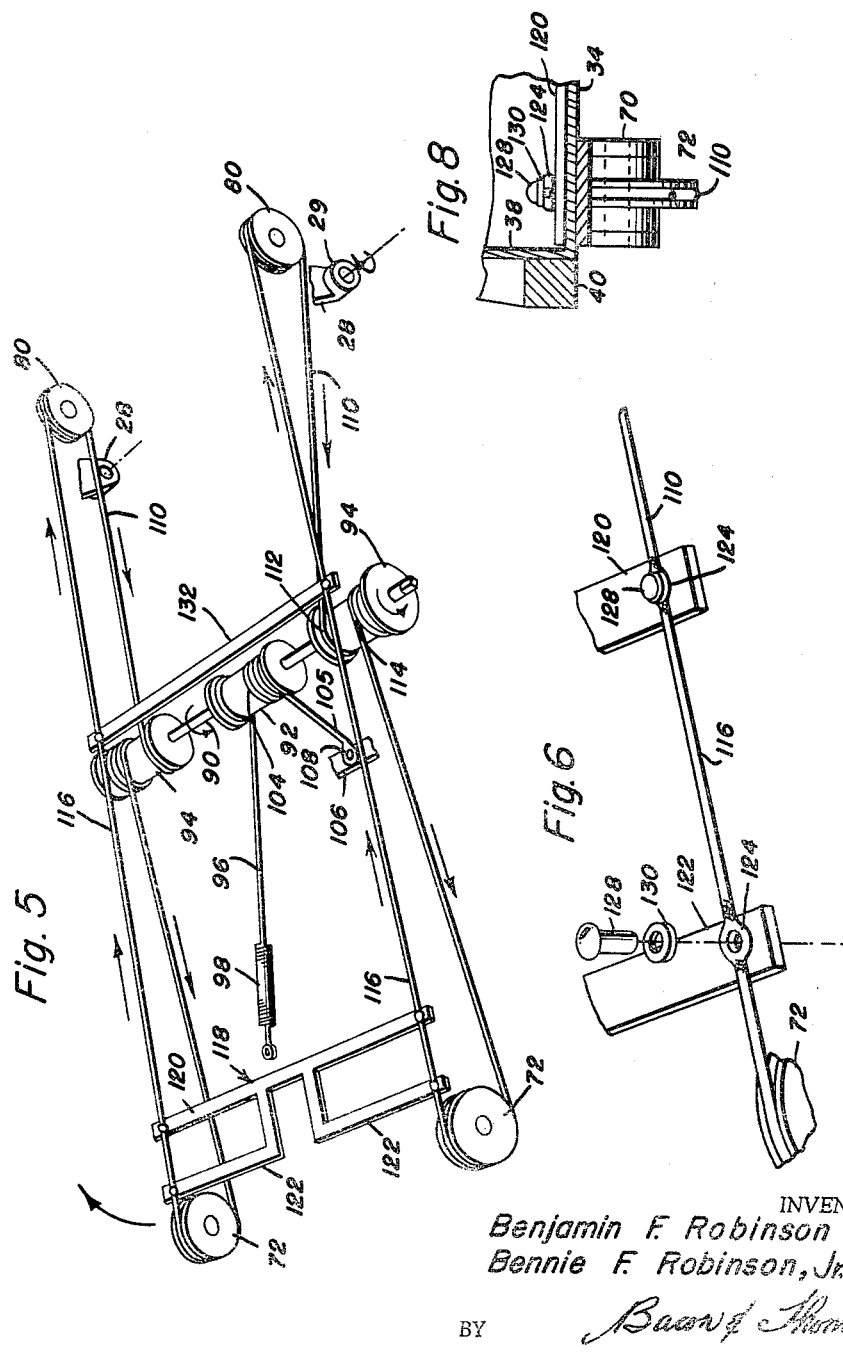

United States Patent Office 3,164,410
Patented Jan. 5, 1965

3,164,410
DUMP TRUCK SCRAPER PLATE
Benjamin F. Robinson and Bennie F. Robinson, Jr., both of 5240 Forest Road, Columbus, Ga.
Filed July 17, 1963, Ser. No. 295,756
9 Claims. (Cl. 298—1)

This invention relates generally to dump trucks for transporting bulk material, and more particularly to an automatically operated cleaning device for removing clinging deposits of material from the dump box of such a truck during emptying thereof.

The use of dump trucks for hauling bulk material is wide spread, especially in the construction industry. The dump boxes of such trucks are usually emptied merely by tilting them at a steep angle to the horizontal, a satisfactory procedure if the bulk material being handled is relatively dry, such as is usually true for gravel and stone. However, when damp or wet material, such as wet sand or dirt, is being transported, there is a tendency for a certain amount thereof to cling to the bottom of the dump box. The resulting deposits of clinging material, if not removed, can build up to sizable proportions after several loads of damp bulk material have been transported, and are undesirable because they reduce the capacity of the truck, and for other reasons.

The usual procedure for emptying clinging deposits of bulk material from a dump box is for the truck operator, or someone else, to manually dislodge the deposits with the use of a bar or a long shovel while the dump box is in an inclined position. While the accumulations can be thus satisfactorily removed, the procedure is time-consuming and often requires a substantial physical effort on the part of the person doing the cleaning. The cleaning device of the present invention requires no special manual effort, but rather is automatically and simultaneously operated in response to raising and lowering motions of the dump box; thus, the present invention provides safer operation of a dump truck, and can substantially reduce the total time required to completely empty the dump box.

Dump trucks of the type to which this invention relates commonly include a truck chassis having a tiltable dump box mounted thereon, the box being pivoted to the chassis at its lower rear edge. The present invention includes a drum assembly secured to the underside of such a dump box, and operated by a drive cable arrangement in response to raising and lowering of said box.

One or more transversely extending cleaning plates are disposed within the dump box to lie on the bottom thereof. The cleaning plates are attached to operating cables which extend longitudinally of the dump box, and which have their opposite ends secured to the drum mechanism under said box. The drum is automatically revolved by the drive cable arrangement when the dump box is raised, which motion moves the operating cables, and their attached cleaning plates, longitudinally of the dump box. The moving cleaning plates function to loosen any bulk material which might otherwise tend to stick to the bottom of the dump box.

It is an object of this invention to provide a dump body constructed to be automatically emptied.

Another object is to provide an automatically operated cleaning device for a dump truck box.

A further object is to provide a cleaning device for a dump truck box, constructed to be automatically operated by the raising and lowering motions of said box.

It is also an object to provide a dump truck box cleaning device which is automatically returned to its initial position when the raised dump box is lowered.

Still another object is to provide a dump truck box cleaning device which can be economically and easily constructed.

Other objects and many of the attendant advantages of the present invention will become more readily understood from the following detailed description, when taken into consideration with the accompanying drawings, wherein:

FIG. 1 is a fragmentary, partially broken away, top plan view of a dump truck incorporating the cleaning device of the present invention;

FIG. 2 is a fragmentary, partially broken away, side elevational view of the dump truck of FIG. 1, showing in particular the construction of the cleaning device of the invention;

FIG. 3 is a fragmentary, bottom plan view of the dump box of FIGS. 1 and 2, showing in particular the arrangement of the cable drum mechanism;

FIG. 4 is a fragmentary, vertical sectional view, taken along the line 4—4 in FIG. 3, showing in detail the manner in which the drum assembly is mounted;

FIG. 5 is a diagrammatic, perspective view illustrating the operation of the cables of the invention;

FIG. 6 is a fragmentary, exploded perspective view showing the manner in which the ends of the cleaning plates are secured to their associated operating cables;

FIG. 7 is an enlarged, fragmentary, vertical, sectional view, taken along the line 7—7 of FIG. 1; and FIG. 8 is a fragmentary, vertical sectional view, taken along the line 8—8 of FIG. 7.

Referring now to the drawings, a truck chassis is indicated generally at 2, and includes a pair of confronting, longitudinally extending channel members 4. The channel members 4 are attached at their forward ends to a cab assembly 6, and have wheels 8 secured near the rear ends thereof in the usual manner. Secured to rest upon the chassis channel members 4 is a dump body 10.

The dump body 10 includes a lower frame 12, comprising a pair of confronting, longitudinal extending channel members 14, disposed to rest upon the chassis channel members 4. Angle irons 16 are welded to the exterior of the channel members 14, and are positioned to confront like angle irons 18 secured to the chassis channel members 4. The mating flanges of the angle irons 16 and 18 are secured together, as by welding, and function to secure the dump body 10 to the dump truck chassis 2.

Disposed to rest upon the lower frame 12 is an upper frame 20, said frame 20 including a pair of confronting channel members 22. The channel members 22 have a length about equal to that of the channel members 14, and are arranged to rest upon the channel members 14 with the rear ends 24 thereof projecting beyond the rear faces 26 of said channel members 14.

Secured to the exterior of the channel members 22 to project downwardly are a pair of hinge members 28, the lower, collar ends of said members 28 being disposed to confront the ends of the channel members 14.

Hinge pins 30 are received with the collars 29 of the hinge members 28, and pass through suitable openings in the rear ends of the channel members 14. The hinge pins 30 function to pivotally secure the upper frame 20 to the lower frame 12 whereby the former may be tilted at an angle relative to the latter about said hinge pins 30.

Secured to the upper frame 20 of the dump body 10 is a dump box 32. The dump box 32 includes a bottom plate 34, a pair of side plates 36, and a front plate 38. The plates 34, 36 and 38 are preferably constructed of steel, and are exteriorly reinforced at selected positions by braces 40. The braces 40 and the plates 34, 36 and 38 are secured together by welding, or by some other suitable means.

Pivotally attached at the opposite ends of its upper edge to the upper rear corners of the sides plates 36 is a tailgate 42, said tailgate 42 including a plate 44 having external braces 46 secured thereto. The tailgate 42 is held in its closed position by a suitable latch mechanism (not shown for purposes of clarity), which is released by the truck operator, when it is desired to empty the dump box 32.

The bottom plate 34 is disposed to rest upon the upper frame 20, and is secured thereto by welding, or by some other suitable securing means. To empty the dump box 32, the latch holding the tailgate 42 closed is released and the upper frame 20 is pivoted upwardly from the lower frame 12 whereby material contained therein is caused to move downwardly out of the tilted dump box 32 by the force of gravity past the pivoted, unlatched tailgate 42. The dump box 32 can be elevated by any suitable mechanism, such as the hydraulic lifting device indicated generally at 48.

Referring to FIGS. 2 and 4, the lower frame channel members 14 have confronting housing 50 secured thereto a short distance behind the forward edge of the box 32, which housings support a transversely extending shaft 52. The rear end of a suitable hydraulic cylinder 54 is pivotally attached to said shaft 52, and the free end of the piston 56 associated with said cylinder 54 is pivotally attached by a pin 57 medially of an angled crankarm 58. The rear, lower end of the crankarm 58 is pivotally secured to the lower frame 12 by a shaft 60 and the other upper end thereof is pivotally secured to the lower end of an upper crankarm 62.

The upper crankarm 62 is directly upwardly and rearwardly, and the upper end thereof is pivotally secured by a shaft 64 to the upper frame 20. It is thus seen that actuation of the hydraulic cylinder 54 will operate the crankarms 58 and 62, whereby to elevate and lower the dump box 32 about the hinge pins 30. It is to be understood, of course, that hydraulic lifting mechanisms other than that just described might be utilized without departing from the teachings of the present invention.

The structure thus far described is common to many conventional dump trucks. Bulk material to be hauled is placed within the dump box 32 by a dragline or other device, and the truck is then driven to the desired dumping location. The tailgate 42 is then unlatched, and the hydraulic cylinder 54 is actuated to elevate the dump box 32. As the bottom plate 34 of the dump box 32 approaches the vertical, at least the majority of the bulk material contained within said dump box will be discharged therefrom. However, as has been discussed hereinabove, a portion of wet or sticky bulk material can, and often will, cling to and remain within the dump box 32 during the dumping operation, unless removed by a suitable means.

Referring again to FIGS. 2 and 7, the front plate 38 of the dump box 32 has cutout portions 66 near the opposite, lower corners thereof, and the bottom plate 34 has confronting notches 68 therein. A pair of bifurcated brackets 70 are secured to the underside of the bottom plate 34, one near each front corner of the box 32. Rotatably mounted within each bracket 70 is a sheave 72 for receiving a cylindrical, flexible cable.

The tailgate 42 has vertical notches 74 therein near the opposite, lower corners thereof, and the rear edge of the bottom plate 34 has notches 76 therein positioned to confront the notches 74. A pair of bifurcated brackets 78, which are identical to the brackets 70, are secured to the underside of the bottom plate 34, one near each rear corner thereof. A sheave 80 is rotatably mounted within each of the brackets 78.

Referring in particular to FIGS. 2, 3 and 4, a pair of confronting, downwardly projecting, L-shaped brackets 82 are secured medially of the undersurface of the bottom plate 34, said brackets 82 having aligned bores therein which are positioned in alignment with bores 84 in the channel members 22. Positioned outwardly of the channel members 22 in alignment with the brackets 82 are a pair of downwardly projecting, L-shaped brackets 86, said brackets 86 having bores therethrough in alignment with the bores 84. Secured to project downwardly from the opposite outer edges of the dump box 32 are a pair of supporting plates 88, which plates also have bores therethrough in alignment with the bores 84. The brackets 82 and 86 and the plates 88 are aligned along an axis which extends transversely of the dump box 32.

A transversely extending shaft 90 is received within the aligned bores in the channel members 22, the L-shaped brackets 82 and 86, and the supporting plates 88. Positioned centrally on the shaft 90 between the L-shaped brackets 82 is a center drum 92, said drum 92 being fixed to rotate with the shaft 90. Received on the shaft 90 between each pair of opposed brackets 84 and supporting plates 88 is a lateral drum 94, the two lateral drums 94 being identical in construction and being secured to rotate with the shaft 90.

Two cables, one for advancing and one for returning the cleaner plates, are wrapped in opposite directions about the center drum 92, and function to slide the cleaning plates longitudinally of the box 32. Referring to FIGS. 2, 3 and 5, a return cable 96 is wrapped clockwise (as viewed in FIG. 2), around one end of the center drum 92, one end of said cable 96 being secured to said drum. The free end of the return cable 96 extends forwardly from the drum 92, and is connected to one end of a coil spring 98. The other end of the coil spring 98 is anchored to the bottom plate 34 by a bracket assembly 100 and a bolt 102 (best shown in FIG. 2).

An advancing cable 104 is wrapped counterclockwise about the other end of the center drum 92 (as viewed in FIG. 2), and has one end thereof anchored to said drum. The other end 105 of the advancing cable 104 extends forwardly and downwardly from the center drum 92, and is secured to a transversely extending anchor bar 106, which bar is welded to extend between the bottom flanges of the confronting lower frame channel members 14; the end 105 of the cable 104 is secured to the anchor bar 106 by a bolt 108.

The two lateral drums 94 are identical, and each has an operating cable 110 associated therewith. One end 112 of the operating cables 110 is wrapped clockwise about the inner end of its associated side drum 94 (as viewed in FIG. 2), and is anchored thereto. Each operating cable 110 extends rearwardly from its anchored end 112, and is passed over its associated sheave 80, through the notches 74 and 76, forwardly through the interior of the dump box 32, through the notches 66 and 68, downwardly about its associated sheave 72, and rearwardly to its associated lateral drum 94; the end 114 of each operating cable 110 is wrapped counterclockwise (as viewed in FIG. 2) about the outer end of its associated lateral drum 94, and is secured thereto. An excess amount of cable adjacent the cable end 114 is wrapped around each side drum 94, whereby to permit operation of the operating cable mechanism in a manner to be hereinafter described.

Referring to FIG. 5, the operation of the cable mechanism of the invention will now be described. When the dump box 32 is elevated by the hydraulic lift 48, the drums 92 and 94 carried by the shaft 90 will travel upwardly therewith. The end 105 of the advancing cable 104 is secured to the anchor bar 106, and hence the center drum 92 and the shaft 90 are rotated counterclockwise (as viewed in FIGS. 2 and 5) as the dump box 32 is elevated; a sufficient number of excess turns of the cable 104 is initially placed upon the center drum 92 to allow this rotation of the shaft 90 to continue until the dump box 32 has reached its greatest height. Simultaneously with the unwrapping of the advancing cable 104 from the center drum 92, the revolving motion of the shaft 90 will cause the return cable 96 to be wrapped about said drum 92, thereby placing the spring 98 under increasing tension as the dump box 32 is elevated.

As the pump box 32 progresses upwardly and the shaft 90 continues to rotate counterclockwise, the portions of the operating cables 110 adjacent the cable ends 112 will be wrapped about their associated drums 92; simultaneously, the excess turns of the operating cables 110 associated with the cable ends 114 will unwind from the counterclockwise rotating drums 94. This winding and unwinding of the opposite ends 112 and 114 of the operating cables 110 will cause the portions 116 of said cables which are disposed within the dump box 32 to advance toward the rear of said box. When the dump box 32 is returned downwardly to its initial position, the spring 98 will exert sufficient force on the return cable 96 to cause the shaft 90 to rotate in a clockwise direction, whereby the movements of the cables 96, 104 and 110 will be reversed from that just described and they will return to their initial position.

It is thus seen that the portions 116 of the operating cables 110 will advance toward the tailgate 42 of the dump box 32 when said dump box is elevated for emptying. Referring again to the drawings, a front cleaning plate assembly 118 is disposed to lie transversely within the dump box 32, and has its opposite ends secured to the parallel operating cables 110. The cleaning plate assembly 118 includes a rear, transversely extending bar 120, and a pair of L-shaped front bars 122. The bars 122 are secured to the bar 120 in spaced relationship, and define a space therebetween for fitting about any protrusions or equipment which might be internally mounted within the front end of the dump box 32.

The outer ends of the bar 120 and of the L-shaped bars 122 are secured to the operating cables 110. Referring to FIG. 6, each operating cable 110 is provided with a pair of spaced, annular attaching rings 124, positioned to lie over their associated bar ends 120 and 122. The ends of the bars 120 and 122 have bores 126 extending therethrough (FIG. 7), and a rivet 128 is passed through each of the attaching rings 124 and its associated bore 126, and is secured in position in the usual manner. A washer 130 is interposed between the head of each rivet 128 and the top surface of its associated attaching ring 124.

The cleaning plate assembly 118 is positioned within the dump box 32 to lie adjacent the front plate 38 when said dump box is in its down position, resisting upon the lower frame 12. A rear, transversely extending cleaning plate 132 is positioned rearwardly from the cleaning plate assembly 118 a distance equal to about one-half the interior length of the dump box 32, and is secured at its opposite ends to the operating cables 110 in a manner identical to that hereinabove described.

It is thus seen that when the dump box 32 is raised and the center drum 92 is rotated, the front and rear cleaning plate assemblies 118 and 132 will advance progressively toward the tailgate 42. Because of this advancing movement during elevation of the dump box 32, any damp or sticky material which might otherwise cling to the bottom 34 will be scraped therefrom, and will be discharged from the dump box with the remainder of the bulk material. When the dump box 32 has been emptied, the hydraulic lift mechanism 48 will be reversed to allow it to lower to its resting position upon the lower frame 12. As previously explained, this lowering motion will reverse the rotation of the shaft 90, and will cause the cleaning plate assemblies 118 and 132 to return to their initial positions; during the return movement, the plates 118 and 132 will again loosen any material still clinging to the floor 34.

It is thus seen that a dump box cleaning device has been furnished which is automatic in operation, and which will return to its initial position after use thereof. The savings of time and the increased safety resulting from the present invention over the manual cleaning methods of the past are obvious, and it is also apparent that the apparatus of the present invention is relatively uncomplicated and is economical to construct.

While the invention has been described with reference to a dump truck, it is to be understood that it might also be utilized with stationary and other tilting dump boxes without departing from the invention.

Obviously, many modifications and variations of the present invention are possible in the light of the above teachings. It is, therefore, to be understood that within the scope of the appended claims, the invention may be practiced otherwise than as specifically described.

We claim:
1. An automatic cleaning device for a dump box, said box being pivotally secured to a frame, comprising: cleaner plate means receivable within said box, and slidable longitudinally thereof; operating cable means secured to said cleaner plate means; drum means attachable to the bottom of said box, and connected to said operating cable means; said drum means comprising a transversely extending shaft supported under said box; a drive drum carried by and secured to said shaft; and at least one lateral drum carried by and secured to said shaft, and spaced from said drive drum; and means connected with said drum means for rotating the same in opposite directions in response to pivotal movement of said box toward and away from said frame, respectively, said means for rotating said drum means including an advancing cable, one end of said advancing cable being wrapped about and secured to said drive drum, and the other end thereof being secured to said frame; resilient means secured to said box; and a return cable, one end of said return cable being connected to said resilient means, and the other end thereof being wrapped about said drive drum in a direction opposite to that in which said advancing cable is wrapped, and being secured thereto.

2. The combination as recited in claim 1, wherein said operating cable means includes at least one operating cable, the opposite ends of said cable being wrapped in opposite directions about said lateral drum and being secured thereto.

3. The combination as recited in claim 1, including a pair of spaced lateral drums, and wherein said operating cable means includes a pair of operating cables, one for each of said lateral drums, the opposite ends of each cable being wrapped about their associated lateral drum in opposite directions and being secured thereto.

4. In combination: a frame; a box pivotally attached to said frame; cleaner plate means within said box, and slidable longitudinally thereof; and means connected to said box and said frame, and operable to slidably advance and return said cleaner plate means longitudinally of said box in response to pivotal movement of said box toward and away from said frame, said last-mentioned means including: drum means secured to the underside of said box; at least one operating cable, said operating cable having its opposite ends secured to said drum means; means securing said cleaner plate means to said operating cable; an advancing cable having one end thereof secured to said frame, and the other end thereof secured to said drum means; resilient means secured to the underside of said box; and a return cable having one end thereof secured to said resilient means, and the other end thereof secured to said drum means.

5. The combination as recited in claim 4, wherein the opposite ends of said operating cable are wrapped in opposite directions about said drum means, and wherein the ends of said advancing cable and said return cable which are secured to said drum means are wrapped in opposite directions thereabout.

6. The combination as recited in claim 4, wherein said drum means comprises: a transversely extending shaft rotatably mounted on the underside of said box; a first drum secured to said shaft to receive said operating cable; and a second drum secured to said shaft to receive said advancing cable and said return cable.

7. The combination as recited in claim 4, wherein said cleaner plate means comprises: a plurality of spaced, transversely extending bars disposed to lie on the bottom of said box, at least one pair of said spaced bars being interconnected.

8. In combination: a frame; a box pivotally attached near its lower, rear edge to said frame, and including a generally rectangular bottom plate; transversely extending cleaner plate means within said box, and slidable longitudinally thereof on said bottom plate; a plurality of sheaves, one mounted near each corner of said bottom plate; transversely extending drum means secured to the underside of said bottom plate; a pair of operating cables, each operating cable being receivable over a pair of said sheaves and extending longitudinally within said box, and having its opposite ends wrapped in opposite directions about said drum means and secured thereto; means connecting said cleaner plate means to said pair of operating cables; an advancing cable having one end thereof secured to said frame, and the other end thereof wrapped about and secured to said drum means; resilient means secured to the underside of said bottom plate; and a return cable, said return cable having one end thereof secured to said resilient means, the other end thereof being wrapped about said drum means in a direction opposite to said advancing cable, and being secured thereto.

9. The combination as recited in claim 8, wherein said cleaner plate means comprises: a plurality of transversely extending, spaced bars, at least one pair of said spaced bars being interconnected; and means connecting the opposite ends of each of said bars to said operating cables.

References Cited by the Examiner
UNITED STATES PATENTS

| | | | |
|---|---|---|---|
| 1,485,631 | 3/24 | Shea | 214—82 |
| 2,463,987 | 3/49 | Malone | 298—1 |

FERGUS S. MIDDLETON, *Primary Examiner.*

RALPH D. BLAKESLEE, *Examiner.*